Figure 4:
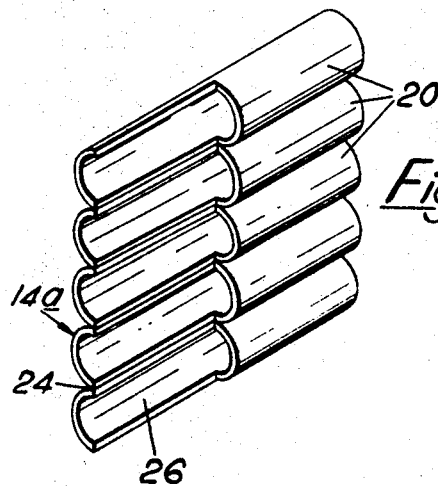

United States Patent

[11] 3,594,536

[72] Inventor Irvin Holroyd
    Barnoldswick, near Colne, England
[21] Appl. No. 823,767
[22] Filed May 12, 1969
[45] Patented July 20, 1971
[73] Assignee Rolls-Royce Limited
    Derby, Derbyshire, England
[32] Priority May 14, 1968
[33] Great Britain
[31] 22720/68

[54] METHOD AND APPARATUS FOR THE SPARK MACHINING OF WORKPIECES AND A SPARK-MACHINING ELECTRODE FOR USE THEREIN
    12 Claims, 9 Drawing Figs.
[52] U.S. Cl. .................................................. 219/69 M, 219/69 E
[51] Int. Cl. .................................................. B23k 9/16
[50] Field of Search .......................................... 219/69 E, 69 M; 204/143 M, 280, 288

[56] References Cited
UNITED STATES PATENTS
2,765,394  10/1956  Griffith .......................... 219/69 E
3,019,178  1/1962  Williams ........................ 204/143 ECM Primary Examiner—J. V. Truhe
Assistant Examiner—Hugh D. Jaeger
Attorney—Cushman, Darby & Cushman ABSTRACT: A spark-machining electrode comprises an electrode plate which is corrugated in at least a portion thereof, the corrugations being of greater height than the thickness of the plate and having parallel axes such that, in a spark-machining operation, relative approaching movement between the electrode and a workpiece parallel to the axes of the corrugations will produce at least one narrow elongated cavity having a cross-sectional dimension less than the height of the corrugations.

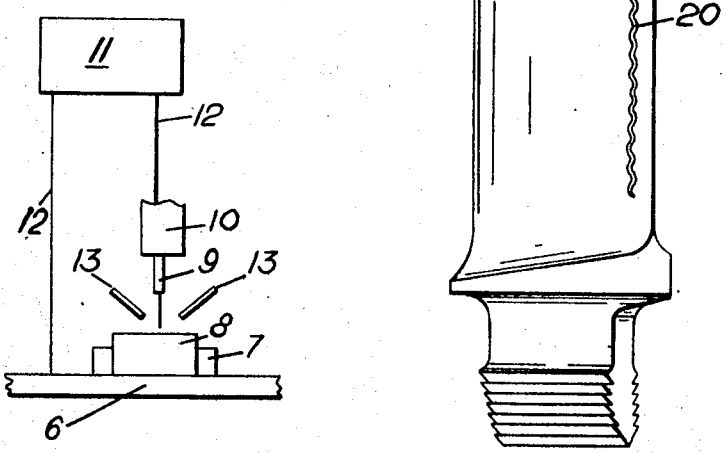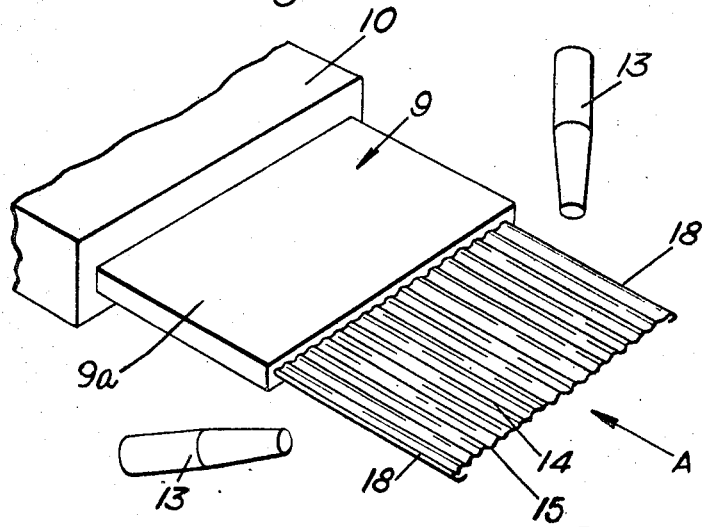

PATENTED JUL20 1971 3,594,536

SHEET 2 OF 3

Inventor
IRVIN HOLROYD
By
Cushman, Darby & Cushman
Attorneys

METHOD AND APPARATUS FOR THE SPARK MACHINING OF WORKPIECES AND A SPARK-MACHINING ELECTRODE FOR USE THEREIN

This invention relates to a method and apparatus for the spark machining of workpieces, and to a spark-machining electrode for use therein.

In one aspect, the invention provides a method of spark machining at least one narrow elongated cavity in a workpiece comprising disposing proximate the workpiece an electrode comprising an electrode plate which is corrugated in at least a portion thereof, the corrugations being of greater height than the thickness of the plate and having parallel axes, applying a potential difference between the workpiece and the electrode and effecting relative approaching movement of the workpiece and the electrode parallel to the axes of the corrugations to spark machine at least one narrow elongated cavity having a cross-sectional dimension less than the height of the corrugations.

Dielectric fluid may be directed towards the electrode and the workpiece for cooling thereof and for the removal of swarf.

In another aspect, the invention provides a spark-machining electrode for use in the above method comprising an electrode plate which is corrugated in at least a portion thereof, the corrugations being of greater height than the thickness of the plate and having parallel axes such that, in a spark-machining operation, relative approaching movement between the electrode and a workpiece parallel to the axes of the corrugations will produce at least one narrow elongated cavity having a cross-sectional dimension less than the height of the corrugations.

The corrugations may have straight axes.

Alternatively, the corrugations may be arcuately curved and have arcuate axes, the centers of respective arcs defining the corrugations and defining the axes thereof all lying on a common straight line which extends perpendicularly to the arcs, the said relative approaching movement being relative approaching movement of the workpiece and the electrode along an arcuate path, the arc defining the path being centered on the common line.

The corrugations may intersect a free edge of the plate, said edge being the leading edge of the plate during said relative approaching movement.

The plate may comprise a number of parallel tubes joined together side by side, like portions of the tubes having been removed to provide corrugations which are scallop-shaped in cross section and which extend to the said edge.

Alternatively, the plate when viewed in a cross section intersecting the axes of the corrugations may have at least one discontinuity, the discontinuity extending to the said edge.

Alternate corrugations may have been removed from the plate to form a plurality of discontinuities.

In another embodiment, the plate may comprise an elongated slot which extends from the said edge longitudinally and transversely of the electrode plate and contains or extends parallel to a surface containing the axes of the corrugations, whereby to form the discontinuity.

The plate may have at least one further free edge which extends parallel to the axes of the corrugations and has been bent over upon itself.

The plate may be of copper.

In a yet further aspect, the invention provides apparatus for spark machining at least one narrow cavity in a workpiece comprising means for mounting a workpiece, an electrode as set forth above, means for applying a potential difference between the workpiece and the electrode and feed means for effecting said relative approaching movement.

There may be provided means to direct a dielectric liquid towards the electrode and the workpiece.

In yet another aspect, the invention provides an article when spark machined by the method or by means of an electrode plate or apparatus as set forth above.

The article may be a gas turbine blade.

Figure 5:
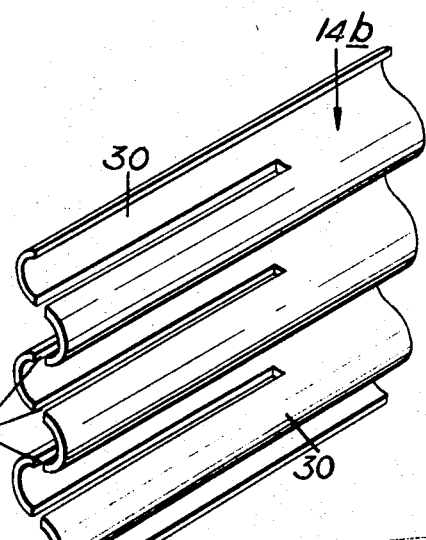
Figure 6:
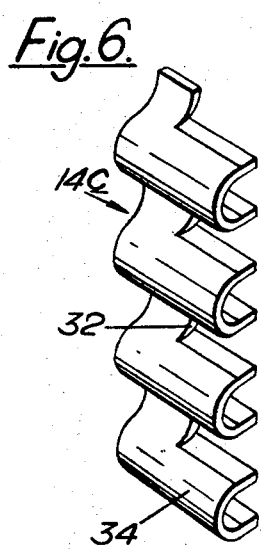
Figure 7:
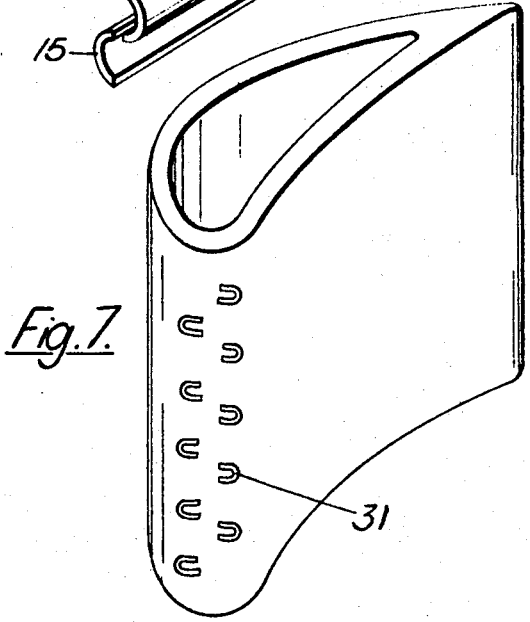
Figure 8:
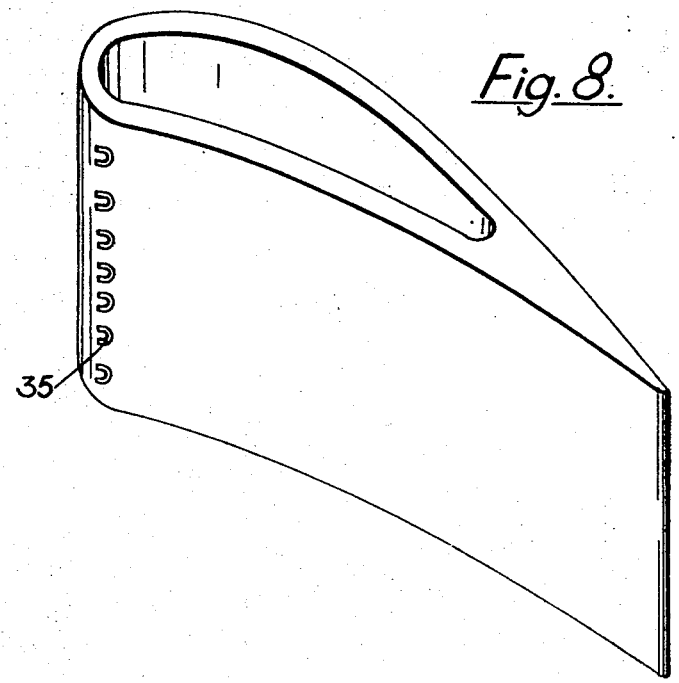
Figure 9:
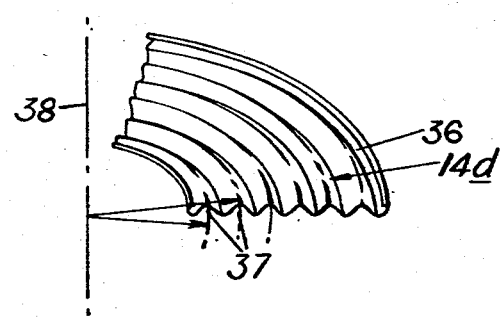

The invention will be described, with reference to the accompanying drawings, wherein:

FIG. 1 shows apparatus according to the invention,
FIG. 2 shows a part of the structure of FIG. 1,
FIG. 3 shows a gas turbine blade which has a narrow elongated cavity produced by the apparatus of FIGS. 1 and 2,
FIGS. 4, 5 and 6 show alternative forms of part of the structure of FIG. 2,
FIGS. 7 and 8 show gas turbine blades produced by apparatus having the structures of FIGS. 5 and 6, and
FIG. 9 shows a yet further form of part of the structure of FIG. 2.

It is often necessary to provide a gas turbine blade with a narrow elongated cavity or slot, e.g. to permit the escape of cooling air. It is necessary that the dimensions of the slot are accurately maintained both from blade to blade and within the extent of the slot.

The elongated slot is often produced at present by spark machining, the spark-machining electrode comprising an electrode plate of rectangular cross section which is clamped in a holding device and which during use is cooled by a cooling dielectric fluid for example paraffin which also removes the swarf produced. The cooling fluid is directed towards and between the workpiece and the electrode plate in the form of jets, causing the electrode plate to vibrate at right angles to its longitudinal edges, that is to say at right angles to its direction of feed relative to the turbine blade. The vibrations cause the slot to be excessively wide, and also cause the variations in the width because the waveform of the vibration has nodes at some points on the electrode plate and maximum amplitude at other points.

The excessive width and the variations in width of the slot not only reduces the efficiency with which the turbine blade is cooled, but also introduces unwanted variations into the rate of cooling at various parts of the blade. Such variations in the rate of cooling may cause thermal stresses in the blade, perhaps leading to reduced life and premature failure.

There is shown in FIG. 1 apparatus which is directed to a solution to this problem.

A spark-machining apparatus comprises means, comprising for example an indexable table 6 and clamps 7, for mounting a workpiece 8 which is to be spark machined. An electrode 9 comprises a mounting member 9a which is mounted in means 10 which are movable to position the electrode 9 relative to the workpiece and to thereafter move the electrode relative to the workpiece during machining to form the desired narrow elongated cavity or slot. Means 11 are provided to establish the necessary potential difference for machining between the electrode and the workpiece via electrical connections 12. Nozzles 13 are provided to apply cooling dielectric fluid to the electrode 9. It will be appreciated that the workpiece may alternatively be moved relative to a stationary electrode.

The parts 6, 7, 10, 11, 12 and 13 may be of a conventional design and will thus not be described in detail.

The electrode 9 is shown in FIG. 2. The electrode comprises an electrode plate 14 which may be of copper or other suitable material; and projects from the mounting member 9a. The plate 14 is corrugated in cross section when viewed in the direction of the arrow A, the axes of the corrugations being straight and parallel to the direction of the relative movement of the electrode and the workpiece during machining. The height (that is to say the overall or peak-to-peak height) of the corrugations is appreciably greater than the thickness of the electrode plate 14. The corrugations extend to a free edge 15 of the electrode plate. The direction of relative movement is of course opposite and parallel to the direction indicated by the arrow A, the edge 15 being the leading edge of the electrode plate, that is to say the edge nearest the workpiece. The plate 14 has further free edges 18 at the sides of the plate.

The corrugations stiffen the electrode plate 14, so that its tendency to vibrate when the jets of cooling fluid from the nozzles 13 impinge thereon during machining is reduced. What vibration does occur tends to be at a higher frequency and of smaller amplitude than with a conventional electrode plate.

The corrugations of FIG. 2 increase the surface area of the electrode plate 14, and may thereby increase the rate of heat transfer therefrom for a given flow of cooling fluid and temperature difference, compared to a conventional plate. Conversely, a given rate of heat transfer from the corrugated plate can be achieved with a lower rate of cooling fluid flow, and this may further decrease the degree of vibration imparted thereto.

The exact shape of the corrugations—when viewed in cross section—is a matter of choice; for example, they may be roughly sinusoidal or they may be of sawtooth form, or "scalloped" as in FIG. 4 discussed hereafter.

FIG. 3 shows a workpiece, actually a hollow turbine blade, having an elongated cavity or slot 20. It can be seen that the slot has a corrugated form corresponding to the corrugations in the electrode plate 14. The corrugated form of the slot increases the surface area thereof an thus improves the cooling of the blade when it is in operation. The cross-sectional width of the slot 20 is only slightly greater than the thickness of the plate 14, and is thus less than the height of the corrugations thereof.

The free edges 18 of the plate 14 extend parallel to the axis of the corrugations and are bent over on themselves, so that, in effect, the edges of the plate 14 are rounded. This results in the edges of the slots formed by the electrode plate 14 being rounded rather than sharp, and they thus do not act as stress-raisers, which may weaken the article (e.g. a turbine blade) in which the slot is cut. Of course, in some articles, sharp-edged slots, or slots having for example one rounded and one sharp edge may be required, in which case the respective edges 18 of the plate would only be bent over on themselves as necessary for the particular shape of slot required.

If desired, the electrode plate 14 need not be corrugated across the whole extent of its cross section.

FIGS. 4, 5 and 6 show alternative forms of corrugated electrode plates 14. In FIG. 4 the electrode plate 14a comprises a plurality of parallel tubes 20 which have been joined together side by side, e.g. by brazing, at 24. A like portion of each of the tubes has been cut away to a diametral plane, resulting in the remaining semicylindrical portions 26 of the tubes forming a corrugated plate, the corrugations in cross section being of scalloped shape.

In FIG. 5 the electrode plate 14b is discontinuous in cross section when viewed in a cross section perpendicular to the axes of the corrugations. The discontinuities are due to parts of the corrugations of the electrode plate having been removed to provide an elongated slot 28 which extend longitudinally of the electrode plate from the edge 15. The slots preferably contain, or are parallel to a surface containing, the axes of the corrugations. The electrode plate 14b is thus suitable for simultaneously machining a plurality of narrow elongated cavities in a workpiece. Each part 30 of the corrugations is curved about its axis, and is thus stiffer than a flat member of the same thickness.

FIG. 7 shows a hollow gas turbine blade having cooling cavities 31 machined by means of the electrode plate of FIG. 5. The slots are spaced along the leading edge of the blade, along the radial extent thereof.

FIG. 6 shows another form of electrode plate having a discontinuous cross section. The electrode plate 14c is basically similar to that of FIG. 2, but alternate corrugations 32 have been removed for a part of their length. The stiffness of the remaining corrugations 34 is maintained due to the curvature thereof. FIG. 8 shows a hollow gas turbine blade having a plurality of elongated narrow cavities 35 machined by means of the electrode plate of FIG. 6. It will be noted in both FIGS. 7 and 8 that the narrow elongated cavities have a cross-sectional width which is less than the height of the corrugations used to form the cavities.

Although the invention is illustrated as applied to electrodes for forming straight cavities or slots, or a series of cavities lying in a straight line, e.g. FIGS. 7 and 8, there may be formed by suitably shaping the plate 14 slots that are curved when viewed perpendicular to their length, or a series of cavities lying in a curved line. For example, a plate formed into a hollow cylinder will produce a narrow elongated annular cavity.

Furthermore, slots or cavities having curved axes may be produced, provided the relative approaching movement of the workpiece and the electrode plate is parallel to the axes of the corrugations. Thus, as shown in a perspective view FIG. 9, an electrode plate 14d shaped as an annular sector has arcuate corrugations 36 with arcuate axes 37, the centers of the arcs defining the corrugations 26 and the axes 37 all lying on a common straight line 38 which extends perpendicularly to the axes of the corrugations, the relative approaching movement of the electrode plate 14d and the workpiece being relative approaching movement thereof along an arcuate path, the center of the arc defining the path being on the common line 38.

It will be appreciated that although the invention is particularly concerned with a problem occasioned by the use of a cooling fluid, the use of a cooling fluid is not an essential part of the invention.

It also will be appreciated that the invention can be applied to the spark machining of a wide range of articles and is not restricted to its application to turbine blades.

I claim:

1. An improved spark-machining method for substantially improving the dimensional accuracy of a spark-machined narrow elongated cavity within a workpiece wherein the flow of cooling dielectric fluid normally induces undesirable vibrations in a spark-machining electrode, said method comprising the steps of:

disposing proximate the workpiece an electrode comprising an electrode plate which is corrugated in at least a portion thereof, the corrugations being of greater height than the thickness of the plate and having parallel axes, applying a potential difference between the workpiece and the electrode, and effecting relative approaching movement of the workpiece and the electrode parallel to the axes of the corrugations to spark machine at least one narrow elongated cavity having a cross-sectional dimension less than the height of the corrugations.

2. A method as claimed in claim 1 wherein the corrugations have straight axes.

3. A method as claimed in claim 1 wherein the corrugations are arcuately curved and have arcuate axes, the centers of respective arcs defining the corrugations and defining the axes thereof all lying on a common straight line which extends perpendicularly to the arcs, the said relative approaching movement being relative approaching movement of the workpiece and the electrode along an arcuate path, the arc defining the path being centered on the common line.

4. A method as claimed in claim 1 wherein the corrugations intersect a free edge of the plate, said edge being the leading edge of the plate during said relative approaching movement.

5. A method as claimed in claim 1 wherein the plate comprises a number of parallel tubes joined together side by side, like portions of the tubes having been removed to provide corrugations which are scallop-shaped in cross section and which extend to the said edge.

6. A method as claimed in claim 4 wherein the plate when viewed in a cross section intersecting the axes of the corrugations has at least one discontinuity, the discontinuity extending to the said edge.

7. A method as claimed in claim 6 wherein alternate corrugations have been removed from the plate to form a plurality of discontinuities.

8. A method as claimed in claim 6 wherein the plate comprises an elongated slot which extends from the said edge longitudinally and transversely of the electrode plate and contains or extends parallel to a surface containing the axes of the corrugations, forming the discontinuity.

9. A method as claimed in claim 1 wherein the plate has at least one further free edge which extends parallel to the axes of the corrugations and has been bent over upon itself.

10. A method as claimed in claim 1 wherein the plate is of copper.

11. A method as claimed in claim 1 comprising directing dielectric fluid towards the electrode and the workpiece for cooling thereof and for the removal of swarf.

12. An article made by the method of claim 1.